United States Patent [19]

Jones

[11] Patent Number: 5,123,387
[45] Date of Patent: Jun. 23, 1992

[54] ROTARY ENGINE WITH INSERTS IN ROTOR FACES

[75] Inventor: Charles Jones, Hillsdale, N.J.

[73] Assignee: Rotary Power International, Inc., Woodridge, N.J.

[21] Appl. No.: 569,102

[22] Filed: Aug. 17, 1990

[51] Int. Cl.$^5$ ............................................. F02B 53/00
[52] U.S. Cl. .................................. 123/218; 123/205; 123/242
[58] Field of Search .................. 123/218, 242, 205; 418/61.2, 83, 178

[56] References Cited

U.S. PATENT DOCUMENTS

| | | | |
|---|---|---|---|
| 3,144,006 | 8/1964 | Meurer | 123/205 |
| 3,888,606 | 6/1975 | Uy | 418/179 |
| 3,974,309 | 8/1976 | Uy | 418/179 |
| 3,995,602 | 12/1976 | Burley | 123/242 |
| 4,066,044 | 1/1978 | Jones et al. | 123/205 |
| 4,067,670 | 1/1978 | Goloff | 418/178 |
| 4,080,934 | 3/1978 | Jones | 123/205 |

FOREIGN PATENT DOCUMENTS

| | | | |
|---|---|---|---|
| 964131 | 7/1964 | United Kingdom | 123/205 |

OTHER PUBLICATIONS

"An Update of the Direct Injected Stratified Charge Rotary Combustion Engine Developments at Curtiss--Wright", Jones et al., SAE Paper 770044, Mar. 1977.

*Primary Examiner*—John J. Vrablik
*Attorney, Agent, or Firm*—Robin, Blecker, Daley & Driscoll

[57] ABSTRACT

A rotary engine includes a rotor with a plurality of working surfaces. Each working surface of the rotor includes a recess covered by an insulating plate. A ledge is formed within and part way around a periphery of the recess and across one end of each recess. A slot extends into the rotor adjacent the other end of each recess. The plate is supported by the ledge and has one end fixed to a corresponding end of the recess. The other end of each plate is slidably received in the slot so that the plate is spaced apart from a bottom surface of the recess, thus forming an insulating air space or chamber between the plate and the body of the rotor. A small vent through the plate prevents pressure changes within the chamber from deforming the plate.

5 Claims, 2 Drawing Sheets

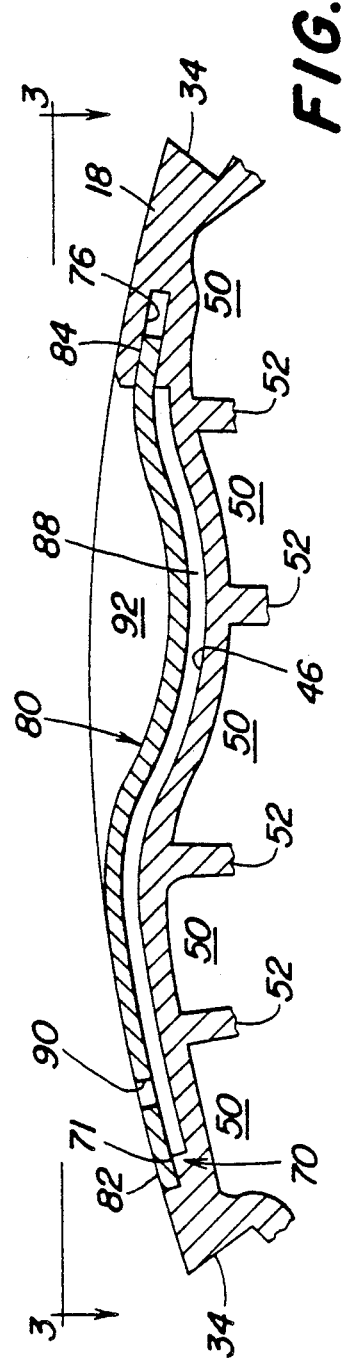

ROTARY ENGINE WITH INSERTS IN ROTOR FACES

BACKGROUND OF THE INVENTION

The invention relates to rotary combustion engines of the type disclosed in U.S. Pat. No. 2,988,065 granted June 13, 1961 to Wankel et al, and particularly, to such an engine designed for operation as a stratified charge engine, for example, as disclosed in U.S. Pat. No. 3,246,636 granted Apr. 19, 1966 to Bentele and U.S. Pat. No. 3,894,518 granted July 15, 1975 to Gavrun et al.

In such stratified charge engines the fuel discharged by high pressure fuel nozzles strikes the working surfaces of the engine rotor. If the rotor working surfaces are too cool, this causes the formation of heavy carbon deposits on the rotor surfaces as well as the generation of significant smoke in the engine exhaust and increases in the amount of hydrocarbons in the engine exhaust. This is particularly true where the interior of the rotor is cooled by a cooling medium such as oil, for example, as disclosed in U.S. Pat. No. 3,176,915 granted Apr. 6, 1965 to Bentele et al.

Various designs have been proposed in attempts to solve this problem. For example, U.S. Pat. No. 3,359,956 granted Dec. 26, 1967 to Bentele discloses a stratified charge rotary engine in which the rotor working surfaces are provided with a coating of low thermal conductivity so as to increase the temperature of the rotor working surfaces. This serves to decrease the aforementioned carbon debit build-up on the rotor as well as the smoke and hydrocarbons in the engine exhaust. U.S. Pat. No. 3,359,956 to Bentele, however, has the disadvantage in that the rotor coating tends to chip or flake off, particularly if relatively thick coatings are applied to the rotor to provide a coating of significant insulating properties over the rotor. This flaking is probably the result of thermal shock caused by temperature differences between the inner and outer surfaces of the coating during engine operation.

U.S. Pat. No. 3,995,602 granted Dec. 7, 1976 to Burley discloses a rotary engine rotor in which insulating plates are fixed to the rotor working surfaces. However, the plates have to be welded to the rotor around their entire periphery and the plate flexes as its temperature changes.

U.S. Pat. No. 4,067,670 granted Jan. 10, 1978 to Goloff discloses a rotary engine in which each rotor working surface is provided with an insert. However, each insert includes a plurality of separate insert sections, each of which is secured to the rotor by a separate bolt or rivet.

U.S. Pat. No. 4,080,934 granted Mar. 28, 1978 to Jones discloses a stratified charge rotary engine in which the rotor working surfaces are provided with inserts which are separated and thermally insulated from the rotor. However, the design disclosed therein is complicated and expensive because thermal expansion of the insert requires the use a complex flexible bolt securing means.

SUMMARY OF THE INVENTION

Accordingly, an object of this invention is to provide a rotor for a rotary combustion engine with an improved insulating plate or insert arrangement.

A further object of the invention is to provide such a rotor configuration having an insert or cover which forms an insulating air space between each insert and the body of the rotor.

Another object of the invention is to support each rotor insert in such a manner on the rotor as to permit relative thermal expansion and contraction between the insert and the body of the rotor.

These and other objects are achieved by the present invention, wherein each working surface of the rotor includes a recess covered by an insulating plate. A ledge is formed at one end of each recess and a slot extends into the rotor adjacent the other end of each recess. One end of each plate is fixed to the ledge and the other end of each plate is slidably received in the slot so that the plate is spaced apart from a bottom surface of the recess, thus forming an insulating air space or chamber between the plate and the body of the rotor. A small vent through the plate prevents pressure changes within the chamber from deforming the plate.

BRIEF DESCRIPTION OF THE DRAWINGS

FIG. 2 is an enlarged view of a portion of FIG. 1;

FIG. 3 is a view taken along lines 3—3 of FIG. 2; and

DETAILED DESCRIPTION

Figure 1:
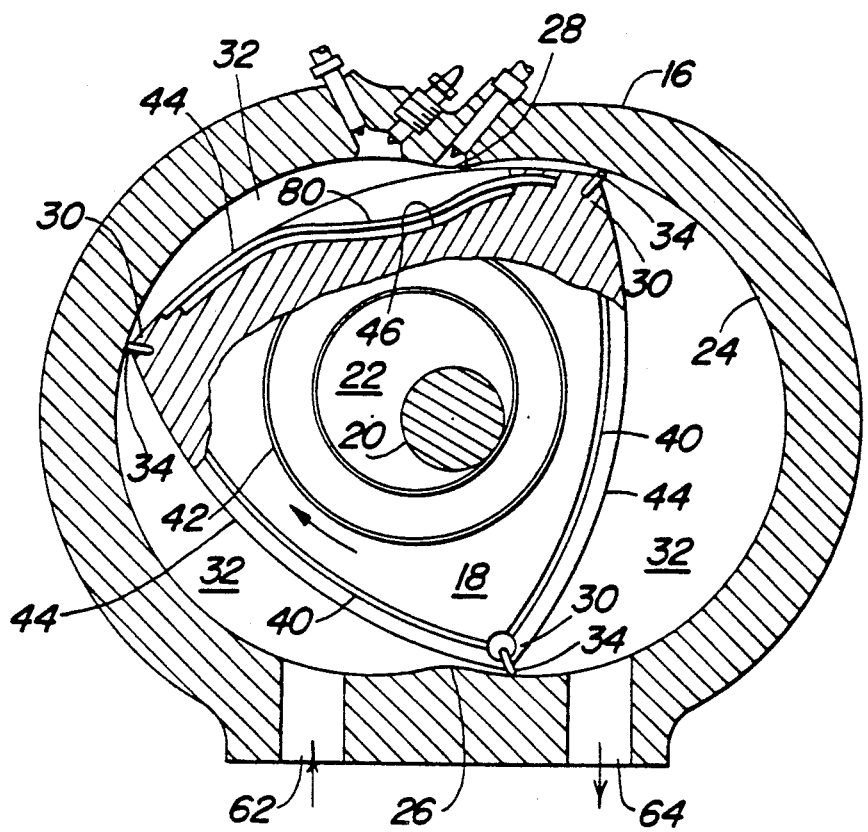
FIG. 1 is a simplified sectional view of a rotary engine embodying the invention along the rotor rotation axis.

Referring to FIG. 1, a rotary combustion engine 10, is generally similar to that described in the aforementioned patents. The engine 10 comprises an outer body or housing consisting of two axially spaced end housings (not shown) and an intermediate or rotor housing 16, these housing parts being secured together to form the engine internal cavity therebetween. A rotor 18 is journaled for rotation within the housing cavity on an eccentric portion 20 of a shaft 22 which extends coaxially through and is supported by the end housings.

The peripheral inner surface 24 of the intermediate housing 16 has having a two-lobe profile which preferably is basically an epitrochoid, the two lobes joining at junctions or regions 26 and 28 near a minor axis of the engine. The rotor 18 has a generally triangular profile with apex portions 30 having sealing cooperation with the trochoid surface 24 to form three working chambers 32 between the rotor and the housing parts. Each of the rotor apex portions is provided with a conventional seal 34 which extends across the rotor between the inner walls of the end housings.

The rotor also has suitable seal strips 40 on its end faces adjacent to the rotor periphery and extending between adjacent apex portions 30 of the rotor for sealing contact with the inner walls of the end housings. Each end face of the rotor 18 also has a suitable annular oil seal 42. Springs (not shown) are provided for urging the seals 40 and 42 into contact with the housing end walls 12 and 14. Each of the three peripheral or working surfaces or faces 44 of the rotor extend between adjacent apex portions 30 of the rotor and preferably have a trough-like recess 46.

As best seen in FIG. 2, the interior of the rotor 18 preferably is divided into circumferentially-spaced compartments 50 by partitions 52 to facilitate cooling of the rotor by circulation of oil or other cooling medium through these compartments, for example, as described in U.S. Pat. No. 3,176,915 granted on Apr. 6, 1965 to Bentele et al. This oil cooling of the rotor is provided to minimize thermal distortion of the rotor and to protect the rotor bearing (not shown) and rotor seals from excessive heat.

Referring again to FIG. 1, the engine housing 16 also includes an air intake passage 62 disposed adjacent to and on one side of the minor axis region 26 of the trochoid surface 24 and an exhaust passage 64 disposed on the other side of said minor axis region. Combustion is initiated in the engine working chambers adjacent to the other minor axis region 28 of the trochoid surface.

Figure 4:
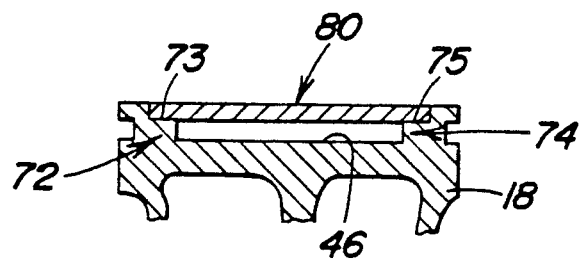
FIG. 4 is a sectional view taken along line 4—4 of FIG. 3.

Referring now to FIGS. 2, 3 and 4, within each recess 46 there is an end ledge 70 at one end which defines a radially outwardly facing ledge or support surface 71. Side ledges 72 and 74 define similar side ledge surfaces 73 and 75. At the other end of each recess 46 a slot 76 extends into the rotor 18 away from the recess 46 and in a direction generally parallel to the outer periphery of the rotor 18. The slot 76 has a long dimension which extends in a direction parallel to a rotation axis of the rotor 18 The open end of the slot 76 communicates with the recess 46. As best seen in FIG. 2, a lip radially separates the slot 76 from the working surface 44.

An insulating plate 80 is mounted over each recess 46. The end 82 and the sides of the plate 80 engage and are supported by the ledge surfaces 71, 73 and 75. The end 82 is fixed, such as by welding, to the rotor 18. The other end 84 of the plate 80 is slidably received in the slot 74. The end ledge 70 is dimensioned so that the outer surface of plate end 82 joins smoothly with the adjacent surface of the rotor 18. The plate 80 has a substantially uniform rectangular cross sectional shape as best seen in FIG. 4. The profile of the plate 80 matches the profile of the bottom surface of recess 46 so that the entire plate 80 is spaced apart from the bottom surface of recess 46. The plate 80, the rotor and the recess thus enclose an insulating chamber 88. A vent 90 extends through the plate 80 and communicates with the chamber 88 to prevent pressure build up in the chamber 88 due to temperature increases. Thus, pressure stresses in the plate 80 are avoided or reduced because of the pressure venting by vent 90 and because the plate 80 is free to expand and contract as a result of temperature changes because the end 84 is free to slide in slot 74.

Optionally, a few small support posts (not shown) could be placed between the plate and the bottom surface 46 to limit downward deflection of the plate 80 as a result of bending stresses and to prevent the plate 80 from contacting and conducting heat to the bottom surface 46. Such posts should be limited in size and number to limit heat conduction from the plate. Finally, the bottom surface 46 and the plate 80 are both contoured to form a combustion pocket 92. Because the plate 80 is insulated from the cooler rotor 18, the plate will maintain a higher operating temperature. This reduces the formation of heavy carbon deposits on the rotor surfaces, reduces the generation of smoke in the engine exhaust and reduces the amount of hydrocarbons in the engine exhaust.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A rotor for a rotary combustion engine, the rotor having a plurality of circumferentially spaced apex portions, a plurality of working surfaces extending between adjacent apex portions, each working surface having a recess formed therein, and an insulating plate for each recess, characterized by:

a slot formed in the rotor adjacent one end of each recess, the rotor having a lip which radially separates each slot from the working surface; and one end of each plate being rigidly fixed to the rotor and a second end of each plate being slidably received in a corresponding one of the slots.

2. The rotor of claim 1, wherein: the slot extends in a direction parallel to a rotation axis of the rotor.

3. The rotor of claim 1, wherein:

a ledge is formed within each recess, the ledge forming a ledge surface extending partially around an outer portion of a bottom surface of the recess and extending across a first end of the recess;

the slot is formed in the rotor adjacent a second end of each recess, the slot having an open end communicating with the recess, and the slot extending away from the recess and generally parallel to an outer periphery of the rotor; and each plate engaging the ledge surface and having its first end fixed to the rotor adjacent the first end of the recess, the plate being supported by the ledge surface and by a wall of the slot so that the plate is entirely spaced apart from the bottom surface of the recess, the recess, the plate and the bottom surface defining an insulating chamber therebetween which permits the plate to maintain a higher operating temperature than that of the rotor.

4. The rotor of claim 3, wherein:

each plate has a vent extending therethrough and communicated with the chamber to prevent a pressure build-up therein.

5. The rotor of claim 1, wherein:

each plate and recess bottom surface are contoured to form a pocket exposed to combustion gasses.

* * * * *